US006962950B1

(12) United States Patent
Bastioli et al.

(10) Patent No.: US 6,962,950 B1
(45) Date of Patent: Nov. 8, 2005

(54) POLYMERS OF A HYDROPHOBIC NATURE, FILLED WITH STARCH COMPLEXES

(75) Inventors: Catia Bastioli, Novara (IT); Vittorio Bellotti, Fontaneto D'Agogna (IT); Alessandro Montino, Robbio Lomellina (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 09/787,831

(22) PCT Filed: Sep. 22, 1999

(86) PCT No.: PCT/EP99/07038

§ 371 (c)(1),
(2), (4) Date: Jun. 15, 2001

(87) PCT Pub. No.: WO00/17270

PCT Pub. Date: Mar. 30, 2000

(30) Foreign Application Priority Data

Sep. 22, 1998 (IT) ........................................ TO98A0800

(51) Int. Cl.[7] ............................ C08L 3/00; C08L 89/00
(52) U.S. Cl. ............................................ 524/47; 524/48
(58) Field of Search ...................................... 524/47–53

(56) References Cited

U.S. PATENT DOCUMENTS

| | | | | |
|---|---|---|---|---|
| 4,133,784 A | * | 1/1979 | Otey et al. | 523/128 |
| 5,650,454 A | * | 7/1997 | Hoover et al. | 368/23 |
| 6,211,325 B1 | * | 4/2001 | Sun et al. | 528/66 |

FOREIGN PATENT DOCUMENTS

| | | | |
|---|---|---|---|
| EP | 0 404 727 A | | 12/1990 |
| EP | 0437589 | * | 7/1996 |
| EP | 0 795 581 A | | 9/1997 |
| EP | 0 965 615 A | | 12/1999 |
| WO | WO 92 14782 A | | 9/1992 |
| WO | WO 08 20073 A | | 5/1998 |

OTHER PUBLICATIONS

Derwent Publications Ltd., London, GB; Database WPI—XP002031921 & CA 2 069 861 A (Beshay); Abstract; Nov. 29, 1993.

* cited by examiner

*Primary Examiner*—James J. Seidleck
*Assistant Examiner*—U. K. Rajguru
(74) *Attorney, Agent, or Firm*—Bryan Cave LLP

(57) ABSTRACT

Hydrophobic polymers incompatible with starch containing, as a filler, a starch complex dispersed in the polymer matrix in the form of particles with numeric mean dimension of less than 3 microns, bound to the polymer matrix by coupling agents containing groups compatible with the matrix and with the complex, in which the starch complex is characterized by second-derivative IR absorption in the region of 940–952 $cm^{-1}$ are described or wherein the starch complex is bound to the polymeric matrix through reactive groups contained in the complex capable of being fixed to the polymeric matrix. The starch complex in the case of biodegradable polymers such as the aliphatic or aliphatic aromatic polyesters is formed with complexing agents different from the polymer forming the matrix and from EVOH copolymers.

26 Claims, No Drawings

POLYMERS OF A HYDROPHOBIC NATURE, FILLED WITH STARCH COMPLEXES

The present invention relates to polymers of a hydrophobic nature incompatible with starch comprising, as a filler, a starch complex in the form of particles of very small dimensions.

It is known from the literature (WO 92/14782, Bastioli et al. J. of Environmental Pol. Degradation—No. 1, Vol. 3, 181–191, 1993) that starch is present in products produced by the extrusion of mixtures of starch with copolymers of ethylene with vinyl alcohol, in the form of a complex forming an interpenetrated structure with the ethylene copolymer. Upon TEM (Transmission Electron Microscope) examination, the structure shows the presence of phases with sub-micronic dimensions mixed with no sharp separating boundaries.

As a result of treatment in water at 100° C. with vigorous stirring, the interpenetrated structure breaks up, forming a micro-dispersion of micro-spherical aggregates with particles of diameter of less than 1 micron, or forming a layered structure by which the starch is rendered partially soluble.

The droplet-like structure has been observed with the use of an EVOH copolymer containing 60% of vinyl alcohol, in moles; the layered structure, on the other hand, has been produced with a copolymer containing 80% of vinyl alcohol, in moles.

There is a great need to be able to disperse starch in polymers incompatible with starch, in the form of a complex which has poor solubility in water, with very small dimensions of the dispersed particles, in view of the improved and novel properties which this filler could introduce.

Up to now, starch has been dispersed in hydrophobic polymers such as polyethylene in the non-destructured, crystalline form.

Destructured starch has been used as a filler in rubbers (U.S. Pat. Nos. 5,374,671 and 5,545,680). However, the dimensions of the dispersed particles are not small enough because of difficulties in dispersing the starch finely in an incompatible polymer matrix such as rubber. The starch is in fact dispersed in the form of filament-like particles.

In the United States patents cited above, the possibility of using destructured starch in compositions containing thermoplastic polymers is also pointed out. However, the compositions referred to in the patents are not suitable for the formation of micro-dispersions, both because the method of preparing the compositions is not suitable for the formation of the right micro-structures, and owing to the fact that excessively hydrophilic copolymers unsuitable for forming micro-structures are used. In the case of the EVOH copolymer, the vinyl alcohol content is 73% in moles.

In the patents cited above, reference is also made to the possibility of using a grafting agent which, however, is not identified further, and which can act as a compatibilizing agent between starch and rubber.

It has now unexpectedly been found that it is possible to disperse, in hydrophobic polymers incompatible with starch, starch complexes characterized by second-derivative FTIR absorption in the region of 940–950 $cm^{-1}$ or by XR diffraction peaks in the regions of 11°–13° and 19°–21° of 2θ, in the form of particles with poor solubility in water and having numeral average size of less than 3 microns, preferably less than 1 micron, and which are fixed to the polymer matrix by means of (a) coupling agent(s) containing groups which can interact with the polymer matrix and with the complex (external coupling agent) or by means of reactive groups present in the complex capable of being fixed to the polymeric matrix thus acting as internal coupling agent. In this case, the use of the external coupling agent can be omitted.

This is, for example, the case of matrices comprising a biodegradable polymer such as the aliphatic or aliphatic-aromatic polyesters, the aliphatic polyamides, polyamides-polyesters, polyurethane-polyesters and the like.

As it will be specified hereinafter, the complex usable with the biodegradable matrices of the type above indicated, is a complex of starch with a polymer different from the polymer forming the polymeric matrix and from the ethylene-vinylalcohol copolymers, or with other complexing agents.

The complex is generally substantially insoluble in water at 100° C.

The solubility is generally less than 20% by weight.

Amylose is present in the complex in wholly or largely complexed form, whereas the amylopectin can be hydrolyzed with acids. It is considered, but this is not binding, that the amylopectin macro-molecules are connected at various points of the chain by hydrogen bonds and by entanglements with the molecules of amylose complexed with the synthetic polymer or other complexing agents. Since the dimensions of the micro-particles of the complex are of the order of those expected for the amylopectin molecules, these molecules can be considered as forming a nucleus surrounded by a shell formed by the amylose/synthetic polymer complex or other complexing agent.

The shell, by interacting with hydrogen bridges or by entanglements with the nucleus, acts as a screen to the solvation of the amylopectin.

The starch compositions used for the dispersion indicated above are constituted by or comprise starch complexes showing the above specified FTIR band or XR diffraction, peaks from which micro-dispersions of particles with numeral average diameter of less than 1 micron are formed by treatment with boiling in water with vigorous stirring.

The starch usable for the formation of the complexes usable as fillers contains more than 15% by weight, and preferably more than 20% by weight, of amylose; amylopectin is present in quantities up to 85% by weight and preferably up to 80%.

The starch may originate from tubers, cereals or beans and may be maize, potato, tapioca, pea, or rice starch, etc. It is preferably starch with an amylose content greater than 20% by weight.

Starches with an amylopectin content greater than 85% by weight are not suitable since the amylopectin does not form complexes with the polymers which complex with amylose; a large quantity of the starch is solubilized by treatment by boiling in water.

The compositions mentioned above are prepared by extrusion of the starch in mixture with the complexing thermoplastic polymer and, optionally, with a plasticizer under temperature and shear-force conditions such as to render the components of the mixture rheologically compatible or with a complexing agent. Suitable preparation methods are described, for example, in WO 92/14782, which is incorporated by way of reference. It is also possible to use methods in solution, using common solvents for starch and the complexing agent.

The compositions preferably have a water content at the output of the extruder, before conditioning, of less than 20% by weight and preferably less than 10% by weight, but preferably not lower than 2% and preferably not lower than 4%. A preferred water content as referred to starch plus water in the initial formulation is higher than 5% and lower than 30%. The Tg of the compositions is preferably below 0° C.

The formation of micro-dispersions by boiling in water with stirring and optionally ultrasonication can constitute a criterion for the selection of the operating conditions suitable for the formation of the compositions usable in the method of the invention.

The polymer compatible with starch contains hydrophilic groups intercalated with hydrophobic sequences in which the hydrophilicity properties are balanced in a manner such that the resulting extruded compositions can provide a partial or complete insolubilization of the starch by treatment in boiling water.

For example, in the case of copolymers of ethylene with vinyl alcohol, the vinyl alcohol content, which is preferably greater than 50% in moles, has not to exceed 80–90% in moles, otherwise, by boiling in water, the formation of layers instead of micro-dispersions occurs and starch becomes soluble.

Other suitable copolymers are copolymers of ethylene with acrylic acid, preferably containing from 15 to 25% by weight of acrylic acid.

In general, all copolymers of ethylene with polar monomers such as copolymers with methacrylic, crotonic and itaconic, acids, maleic anhydride and terpolymers containing vinyl acetate are suitable.

Other polymers which can form complexes with starch are 6—6, 6–9 or 12 aliphatic polyamides, aliphatic and aliphatic-aromatic polyesters, polyurethanes/polyamides, polyurethanes/polyethers, polyamides/polyesters, polyurea/polyesters, polyurea/polyethers, polylactic acid, polyglycolic acid, poly(lactic-glycolic) acid, polycaprolactone/urethane, in which the size of the polycaprolactone block is between 300 and 3000 molecular weight.

Other complexing agents can be fatty acids and their derivatives. The complexing agents can contain reactive groups for the hydrophobic matrix thus performing the function of internal coupling agents, such as tetrasulphide or unsaturated groups in case of rubbery matrices.

In the case of ethylene/vinyl alcohol copolymers containing from 20 to 50% of ethylene, in moles, the quantity of copolymer which can complex all of the available amylose is about 20% by weight of the composition.

The more the concentration of the EVOH is reduced, the greater is the relative quantity of amylose complexed, this quantity changing from twice the quantity of EVOH when the concentration of EVOH is 10%, to 3 times when it is reduced to 5%.

This shows that complexing between amylose and EVOH does not form a complex of well-defined composition, but forms a family of complexes.

The preferred formulations for the starch complexes comprise a content by weight of starch between 45 and 65%, with more than 20% of amylose; a complexing agent between 5 and 35%; plasticizers from 0 to 20% and added water from 0 to 15%. Such formulations minimize the size of the dispersed phase.

The dispersion of the composition comprising the starch complex in the hydrophobic polymer is performed by blending in accordance with known methods, for example, by extrusion or calendering in a Banbury mixer in the case of rubbers.

The preferred complexed starch for rubbery compositions is dispersable in the rubber by mixing in a range of temperature between 130 and 170° C., preferably between 140 and 160° C.

It is possible to operate in the presence of a coupling agent. When the complex contains groups which can be fixed to the polymer matrix of the starch, the use of the coupling agent can be omitted.

Suitable coupling agents which can react with the filler and with the polymer matrix when the matrix is of a polyolefin nature or is a styrene-butadiene, polybutadiene, polyisoprene or nitrile rubber, an elastomeric, ethylene/propylene or ethylene/propylene diene copolymer are aliphatic silanes such as dimethyldichlorosilane, methyltrichlorosilane, mercaptopropyltrimethoxysilane and vinyl silanes such as methacryl-oxy-propyltrimethoxysilane and vinyltriethoxysilane.

A particularly suitable silane is bis-3-triethoxysilylpropyl tetrasulphide.

Other coupling agents which may be used are alkyl titanates or esters such as tetraisooctyl titanate, isopropyl-diisostearyl-metacryl titanate, and isopropyltriacryl titanate.

The quantity of coupling agent is between 0.05 and 10% by weight of the starch complex, preferably 0.1–5% by weight.

The coupling agent is preferably added to the starch complex/hydrophobic polymer mixture at the stage of the blending thereof.

The hydrophobic polymer comprises, among others, ethylene polymers such as LDPE, LLDPE, HDPE, ultra low LLDPE, crystalline propylene polymers and copolymers, in particular, isotactic polypropylene, and crystalline propylene copolymers containing 1–10% by weight of ethylene or of a $C_4$–$C_{10}$ alpha olefin.

Other thermoplastic hydrophobic polymers which may be used comprise polyamides, aromatic polyester resins, polyoxymethylene resins, polycarbonates, polyphenylene oxide resins. The rubbers used in the tire industry, such as styrene-butadiene rubbers, polybutadiene or polyisoprene rubbers, or the EP and EPDM rubbers may also be used.

The rubbers may contain, as fillers, the ingredients such as, for example, silica, carbon black and the vulcanizing agents and vulcanization accelerators which are normally used in this field. The rubber matrices containing the starch complexes according to the present invention are conveniently used in the preparation of tyres having valuable properties.

Similarly, the thermoplastic polymers may contain additives such as colourings, stabilizers, and flame-retardant compounds normally used in the field.

The fillers having the characteristics specified above confer to the polymer matrices properties of better coatability, particularly in the case of olefin polymers, better electrical and heat dissipation, a better elastic flow and low hysteresis (particularly in the case of rubbers), and other advantageous properties which vary from one polymer to another.

Biodegradable hydrophobic polymers are also usable. Examples of such polymers are: aliphatic, polyesters, aliphatic-aromatic copolyesters, aliphatic polyamides, polyamides-polyesters polyurea-polyesters, polyurethane-polyesters poliurethane-polyamide. Specific examples are poly-epsilon-caprolactone and poly(butylene terepthalate-butylene adipate).

In the case of the above mentioned biodegradable polymers it has been found advantageous to add to the polymeric matrix a starch complex wherein the complexing agent is a polymer different from the polymer forming the matrix and the ethylene-vinylalcohol copolymers, or selected from the fatty acids and the derivates thereof or from other complexing agents.

It is possible using this type of complex to tailor-make the properties of starch to render the same similar to those of the matrix or different.

For example in the case of the compostable bags, it has been found useful to retard the biodegradability of the starch complex dispersed in the aliphatic or aliphatic-aromatic polyester matrix by complexing the starch with a slowly or not at all biodegradable polymer to avoid the premature degradation of the bag when the same, filled with waste, is stored in humid places and/or contact with condense.

The premature bag breakage with consequent waste spreading is troublesome and represents a limit to the use of the compostable bags for the collection of organic waste.

The polymers used to retard the biodegradability of starch comprise polylactic acid, polyglycolic acid and poly (lactic-glycolic) acid copolymers.

Examples of not significantly biodegradable polymers are the ethylene-vinylacetate copolymers, the ethylene-acrylic acid copolymers, and in general, the ethylene copolymers containing polar groups different from the OH groups.

In the case of complexing agents immiscible with the polyester base-matrix, it is possible to form the complex with the starch directly during the melt-blending of the polyester-starch mixture.

The melt-blending is carried out under temperature and shear conditions suitable to render the starch and the polyester polymeric components rheologically compatible.

As already mentioned, the dispersion of the starch complex in a matrix formed or comprising a biodegradable polymer such as the aliphatic or the aliphatic-aromatic polyesters does not require the use of an external coupling agent.

The filler formed by the starch complex is dispersed in the hydrophobic polymer in quantities of from 0.5 to 50% by weight. The most suitable quantity depends on the type of polymer and on the properties to be imparted thereto. In general, quantities of from 2 to 30% by weight may advantageously be used.

For the test with boiling water, the material is ground in a cryogenic mill and reduced to powder which can pass through 0.5 mm mesh.

The powder is introduced into a reflux flask containing a volume of water 10 times the weight of the powder and is heated to boiling point for 4 hours with vigorous stirring and ultrasonication, if needed.

The following examples are provided by way of non-limiting illustration of the invention.

In the following examples, the quantities of the components are expressed as percentages by weight unless specifically indicated otherwise.

EXAMPLE 1

A mixture was prepared, containing:

40% Cerestar Globe 03401 starch (12.8% water)

40% Nippon Gohsei A-4412 EVOH (EVOH with 44% ethylene by moles)

12% glycerol

3% water

5% urea.

The mixture was supplied to an OMC single-screw extruder with D=20 mm and L/D=30, operating with the following temperature profile: 80/150/140/120° C. and about 40 rpm.

The extruded material with about 6.5% $H_2O$ was pelletized and then filmed by blow extrusion with a Haake extruder with D=10 mm and L/D=20 to give a film about 30 microns thick.

The film produced was ground in a cryogenic mill and reduced to powder which could pass through 0.5 mm mesh. About one gram of powder was then poured into a flask containing 100 ml of distilled water and the mixture was brought to boiling point with vigorous stirring for 4 hours. Upon completion, the insoluble residue, which was about 75% of the initial quantity, which amount corresponded to the sum of starch and EVOH, was filtered out.

The boiling residue, examined by TEM (Transmission Electron Microscope), was constituted by individual particles or by aggregates of particles in which the individual particles had diameters of less than 0.5 microns.

The film, examined by second derivative IR had a band of the starch/EVOH complex at 947 cm−1 and two peaks in the XR diffraction spectrum at 13° and 20° of 2θ.

EXAMPLES 2–4

The following compositions, in which maize starch containing about 28% of amylose was used, were prepared as described in Example 1:

| | Example | | |
|---|---|---|---|
| | 2<br>% | 3<br>% | 4<br>% |
| Cerestar Globe 03401 starch | 50 | 58 | 65 |
| Nippon Gohsei E-3808 EVOH | 30 | 20 | 10 |
| Glycerol | 7 | 8 | 9 |
| Urea | 4 | 4 | 4 |
| Water | 9 | 10 | 12 |

(EVOH E-3808 with 38% ethylene by moles)

Upon application of the breakdown upon boiling test, amounts of insoluble residues approximately equal to the sum of starch and EVOH were obtained. The dimension of the separated particles was less than 0.5 microns.

All of the films, when examined by second-derivative IR, had a band of the complex at 947 $cm^{-1}$ and when examined by XR showed two peaks at about 13° and 20° of 2θ.

EXAMPLES 5–16

The following compositions, in which a starch with a high amylose content (Roquette Eurylon 7, 70% amylose) was used, were prepared as described in Example 1:

| Example | 5 | 6 | 7 | 8 | 9 | 10 | 11 | 12 | 13 | 14 | 15 | 16 |
|---|---|---|---|---|---|---|---|---|---|---|---|---|
| Eurylon 7 | 52 | 60 | 66 | 70 | 52 | 60 | 66 | 70 | 51 | 60 | 66 | 70 |
| D-2908 EVOH | 31 | 20 | 10 | 5 | — | — | — | — | — | — | — | — |
| E-3808 EVOH | — | — | — | — | 31 | 20 | 10 | 5 | — | — | — | — |
| A-4412 EVOH | — | — | — | — | — | — | — | — | 31 | 20 | 10 | 5 |
| Glycerol | 7 | 10 | 12 | 12 | 7 | 10 | 12 | 12 | 7 | 10 | 12 | 12 |
| Water | 10 | 10 | 13 | 13 | 10 | 10 | 12 | 13 | 10 | 10 | 12 | 13 |

Upon application of the breakdown in boiling water test, amounts of insoluble residues equal to the sum of starch and EVOH were obtained, even with the lowest concentrations of EVOH. The size of the separated particles was less than 1 micron, in all the cases but for the concentration of Eurylon between 52 and 60% the particles were by far lower than 0.5 microns.

All of the films, when examined by second-derivative IR, had a band of the complex at 947 $cm^{-1}$.

EXAMPLE 17

Products obtained according to examples 2,3 and 4 brought to complexed starch with a water content between 6 and 10% which was mixed in a Pomini Farrel mixer at 155

C at a content of 20% by weight, with 76% of an SB standard grade for treads and 4% of bis-3-triethoxysilyl propyl tetrasulphide. The final products after etching in DMSO showed a microdispersion of complexed starch with average dimension lower than 0.5 microns under TEM analysis.

COMPARISON EXAMPLE 1

A composition similar to that of Example 5 but with the maize starch replaced by amylose-free waxy starch (Snowflake 04201—Cerestar) was prepared.

Filming of the composition and its subjection to the breakdown in boiling water test did not produce a dispersion of micrometric particles, but a quantity polymer lumps equal to the quantity of EVOH present in the molecule.

A portion of the film examined by TEM showed a micro-layered structure.

COMPARISON EXAMPLE 2

Comparison Example 1 was repeated but with 7.1 parts of waxy starch replaced by Eurylon 7 starch so that the final mixture had an amylose concentration of 5%. Filming of the composition and its subjection to the breakdown in boiling water test produced a residue corresponding to 40 parts of EVOH and 15 parts of starch; this means that the quantity of amylose present was not sufficient to screen the solvation of all of the amylopectin.

A portion of the film, examined by TEM, was shown to be of micro-layered structure.

COMPARISON EXAMPLE 3

Example 1 was repeated but with the EVOH replaced by Du Pont Elvanol 71–30 polyvinyl alcohol.

Filming of the composition and its subjection to the breakdown in boiling water test did not produce any insoluble residue.

A portion of film, examined by TEM, showed a micro-layered structure.

EXAMPLE 18

The following composition (parts by weight):

| | Comparison | A | B |
|---|---|---|---|
| Maize starch | 26.4 | 26.4 | 26.4 |
| Ecoflex (BASF) | 63.8 | 53.3 | 56.3 |
| Eco-PLA D4200 (Cargill) | 0 | 7.5 | 0 |
| Lactic/glycolic acid copolymer (70:30) | — | — | 7.5 |
| Glycerine | 5.5 | 4.35 | 4.6 |
| Water | 4.3 | 3.45 | 3.5 |

(Ecoflex is a poly(butylene adipate/terephthalate) copolymer) were extruded in a twin-screw extruder APV 2030 operating at 180° C./160 rpm and with a throughput of 40 Kg/h.

The water content and MFR after extrusion were:

| | water | MFR(dg/min) |
|---|---|---|
| Comparison | 1.6% | 2.3 |
| Test A | 1.7% | 2.6 |
| Test B | 1.6% | 2.5 |

The material was filmed in a Ghioldi apparatus (40 mm diameter and head of 100 mm) Bags (60×90 cm) were produced.

A test using cut grass to fill the bags, conducted at 30° C. and 75% RH gave the following result expressed as days for obtaining non-transportable bags:

| | days |
|---|---|
| comparison | 3 |
| Test A | 20 |
| Test B | 23 |

The IR spectrum of the film gave a FTIR band at about 947 $cm^{-1}$ typical of complexed starch.

After dissolution of Ecoflex, the residual starch was found to be complexed with polylactic acid and poly(lactic-glycolic) acid.

What is claimed is:

1. Polymers comprising:

A) a hydrophobic polymer matrix formed from a hydrophobic polymer incompatible with starch selected from polymers of group (a) or group (b), wherein the group (a) polymers are selected from the group consisting of aliphatic polyesters, aliphatic-aromatic polyesters, aliphatic polyamides, amide ester copolymers, urethane ester copolymers, urethane amide copolymers, and urea ester co-polymers; and the group b) polymers are selected from the group consisting of ethylene polymers and copolymers, crystalline polypropylene polymers and copolymers, aromatic polyester resins, polyamides, polyoxymethylene resins, polyphenylene oxide resins, and polycarbonates;

B) a starch complex further comprising (1) starch and (2) a complexing agent wherein the starch complex is characterized by: being in the form of particles with a numeral average size of less than 1 micron; a second-derivative IR absorption in the region of 940–950 $cm^{-1}$; and a solubility in 100° C. water of less than 20%;

C) a coupling agent wherein the coupling agent contains groups compatible with the hydrophobic polymer matrix and the starch complex; and wherein the starch complex is dispersed in the hydrophobic polymer matrix and is bound to the hydrophobic polymer matrix by reactive groups present in the starch complex capable of being fixed to the hydrophobic polymer matrix, with the proviso that, if the hydrophobic polymer matrix is formed from a hydrophobic biodegradable polymer selected from the group (a) polymers; then the complexing agent is a different polymer than the hydrophobic biodegradable polymer that forms the hydrophobic polymer matrix and is also different than an ethylene-vinylalcohol copolymer.

2. Polymers according to claim 1 wherein the hydrophobic polymer matrix is formed from a hydrophobic biodegradable polymer selected from the group consisting of aliphatic polyesters, aliphatic-aromatic polyesters, aliphatic polyamides, amide ester copolymers, urethane ester copolymers, urethane amide copolymers, and urea ester copolymers.

3. Polymers according to claim 1, wherein the complexing agent is different from the polymer forming the hydrophobic polymer matrix and is selected from the group consisting of polylactic acid, polyglycolic acid, poly(lactic-glycolic) acid copolymers, ethylene-acrylic acid copolymers, and ethylene-vinylacetate copolymers.

4. Polymers according to claim 1, in which the quantity of starch complex dispersed in the hydrophobic polymer matrix in quantities of is from 0.5 to 50% by weight.

5. Polymers according to claim 1, in which the starch complex is produced from compositions of starch with a complexing agent containing hydrophilic groups intercalated with hydrophobic sequences, wherein the starch complex is present and from which a micro-dispersion of particles with numeral average diameters of less than 1 micron is formed by treatment in water at 100° C. under stirring.

6. Polymers according to claim 1, produced with compositions having a water content of less than 20%, and higher than 2% by weight, and a Tg below 0° C.

7. Polymers according to claim 6, in which the complexing agent is selected from the group consisting of copolymers of ethylene with polar monomers.

8. Polymers according to claim 7, in which the complexing agent is selected from the group consisting of copolymers of ethylene with vinyl alcohol, copolymers of ethylene with vinyl acetate, and copolymers of ethylene with acrylic acid.

9. Polymers according to claim 8, in which the ethylene/vinyl alcohol copolymer contains from 50 to 75% of vinyl alcohol in moles.

10. Polymers according to claim 6, in which the polymer which can complex with the starch is selected from copolymers from the group consisting of urethane ester copolymers, amide ester copolymers, aliphatic polyesters, aliphatic aromatic polyesters, and aliphatic polyamides.

11. Polymers according to claim 1, wherein the starch complexing agent is a fatty acid.

12. Polymers according to claim 1, wherein the starch complexing agent contains reactive groups for the hydrophobic polymer matrix.

13. A method for preparing polymers according to claim 1, comprising: melt-mixing the hydrophobic polymer forming the hydrophobic polymer matrix with the starch complex wherein the hydrophobic polymer is selected from the group consisting of aliphatic-aromatic polyesters, aliphatic polyamides, amide ester copolymers, urethane ester copolymers, urethane amide copolymers, and urea ester copolymers and the complexing agent is different from the hydrophobic polymer forming the hydrophobic polymer matrix and also from ethylene-vinylalcohol copolymers.

14. A method according to claim 13 wherein the starch complex is preformed or formed during melt-mixing.

15. Shaped articles obtained from the polymers of claim 1.

16. Shaped articles obtained from the polymers of claim 1, wherein the hydrophobic polymer is selected from the group consisting of aliphatic polyesters, aliphatic-aromatic polyesters, urethane amide copolymers, urea ester copolymers, and urethane ester copolymers.

17. Films and compostable bags obtained from the polymers of claim 1.

18. Polymers comprising:

A) a hydrophobic polymer matrix formed from a hydrophobic polymer incompatible with starch;

B) a starch complex further comprising (1) starch and (2) a complexing agent;

wherein the starch complex is characterized by: being in the form of particles with a numeral average size of less than 1 micron; a second-derivative IR absorption in the region of 940–950 $cm^{-1}$; and a solubility in 100° C. water of less than 20%;

C) a coupling agent wherein the coupling agent contains groups compatible with the hydrophobic polymer matrix and the starch complex; and wherein the starch complex is dispersed in the hydrophobic polymer matrix and is bound to the hydrophobic polymer matrix by: i) the coupling agent, or ii) the coupling agent and reactive groups present in the starch complex capable of being fixed to the hydrophobic matrix, wherein the hydrophobic polymer matrix is formed from a hydrophobic polymer selected from the group consisting of styrene-butadiene rubbers, polybutadiene rubbers, polyisoprene rubbers, ethylene-propylene and ethylene-propylene-diene rubbers, and natural rubber.

19. Polymers according to claim 18, wherein the coupling agent is selected from the group consisting of vinyl silane, alkyl titanate, and bis-3-triethoxysilylpropyl tetrasulphide.

20. A method for preparing polymers according to claim 18, comprising: mixing the starch complex, hydrophobic polymer, and coupling agent in a melted state or under hot mastication conditions.

21. A method for preparing polymers according to claim 18, comprising: mixing the hydrophobic polymer and starch complex with rubber at a processing temperature between 140 and 160° C., in the presence of coupling agents.

22. A method according to claim 21, in which the coupling agent is used in a quantity of from 0.5 to 10% by weight of the starch complex.

23. Shaped articles obtained from the polymers of claim 18.

24. Shaped articles obtained from the polymers of claim 18, wherein the hydrophobic polymer is selected from the group consisting of aliphatic polyesters, aliphatic-aromatic polyesters, urethane amide copolymers, urea ester copolymers, and urethane ester copolymers.

25. Films and compostable bags obtained from the polymers of claim 18.

26. Tires obtained from the polymers of claim 18.

* * * * *